United States Patent [19]
Wessel

[11] 3,731,195
[45] May 1, 1973

[54] PULSE DURATION MEASURING ARRANGEMENT

[75] Inventor: Wolf Wessel, Schwieberdingen, Germany

[73] Assignee: Robert Bosch GmbH, Gerlingen-Schillerhöhe, Germany

[22] Filed: Oct. 4, 1971

[21] Appl. No.: 186,030

[30] Foreign Application Priority Data

Oct. 7, 1970   Germany..................P 20 49 133.2

[52] U.S. Cl.................................................324/189
[51] Int. Cl...............................................G04f 9/00
[58] Field of Search.....................324/189, 78 E; 304/294

[56] References Cited

UNITED STATES PATENTS

| 3,585,502 | 6/1971 | Barkley | 324/189 |
| 3,466,550 | 9/1969 | Wolf et al. | 324/78 E |
| 3,626,204 | 12/1971 | Brandon | 324/78 E |
| 3,582,678 | 6/1971 | Davis et al. | 324/189 |

*Primary Examiner*—Alfred E. Smith
*Attorney*—Flynn & Frishauf

[57] ABSTRACT

To convert the duration of single sequentially occurring pulses to proportional continuous current characteristic, for example voltage or current, a capacitor is charged by a constant current during the duration of the pulse, and condenser charge measured; to permit use of components in the circuit at operating points of their operating characteristics which exhibit sharp bends, rather than gradual transition, the charging of the condenser is delayed by a predetermined time period with respect to the start of the pulse to be measured, and, the capacitor is maintained at a predetermined initial charge corresponding to the charge which would otherwise accumulate during the delay period. Two capacitors, in two alternately activated channels are used to permit partial discharging, and recharging to a reciprocative level of one capacitor, while the other holds its previous charge for continuous indication of pulse length of the previous pulse.

15 Claims, 3 Drawing Figures

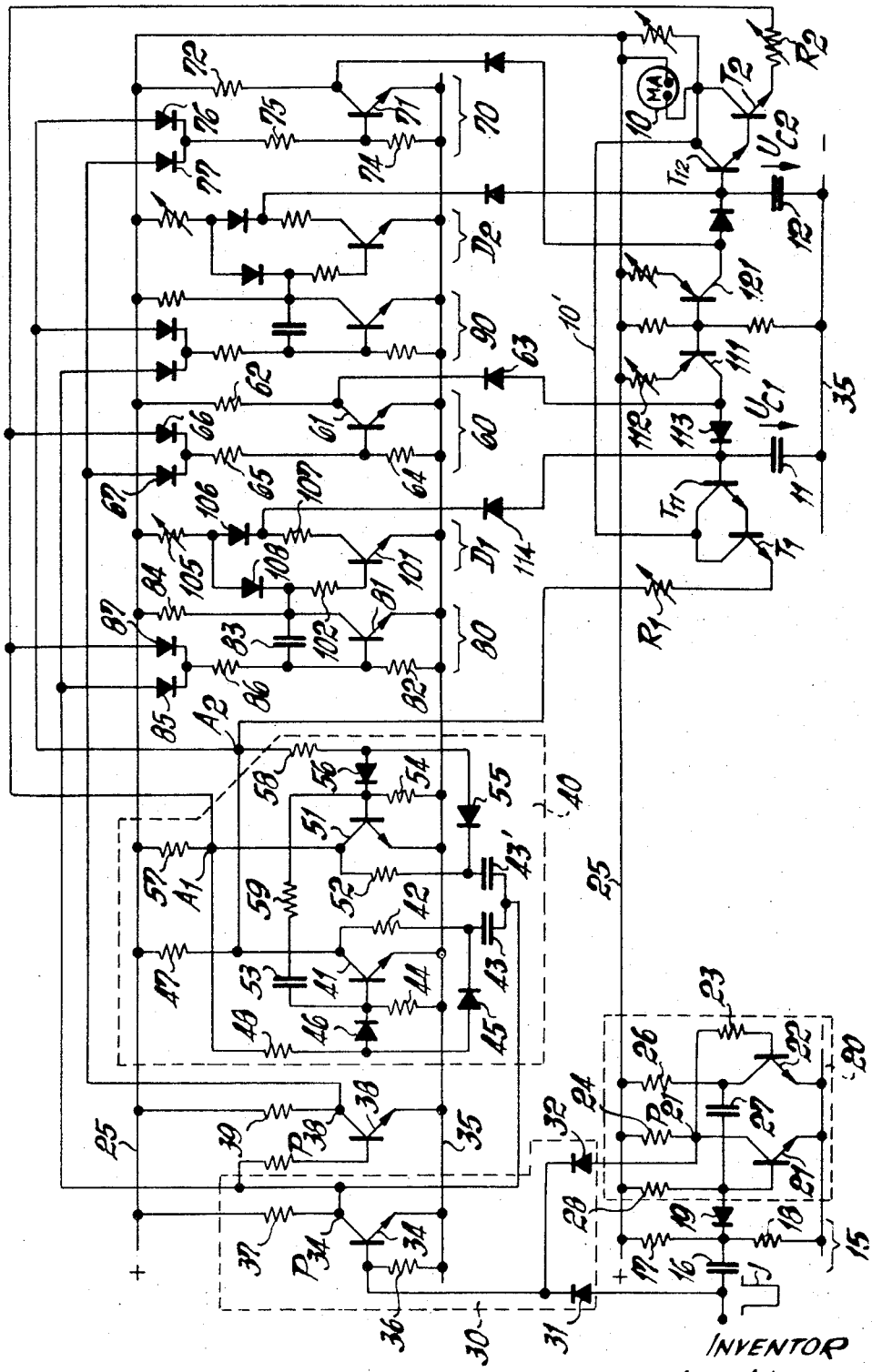

PULSE DURATION MEASURING ARRANGEMENT

The present invention relates to a circuit arrangement to transform pulse duration of electrical pulses into a proportional electrical current, or voltage, and more particularly to this type of arrangement in which a condenser is charged by a constant current and the charge on the condenser, during the pulse duration, is measured.

Pulse duration measuring apparatus in which the pulse duration is measured by measuring a representative charge on the condenser are known. Such measuring arrangements are used, among other applications, to adjust and supervise electronically controlled fuel injection arrangements. Electronically controlled fuel injection arrangements, for example are illustrated and described in U.S. Pat. No. 3,483,851. Fuel, under practically constant pressure is applied to electromagnetically controlled injection valves which are opened by means of electrical pulses, the pulse duration determining the amount of fuel being injected.

It is an object of the present invention to provide a pulse duration measuring apparatus which can be used under machine shop conditions, which is simple, rugged, and still accurate, and in which the duration of even single pulses can be measured.

The measuring apparatus of the present invention is based on the known principle of the linear charge on a condenser during a pulse. In accordance with this known method, the voltage on the condenser, after the end of the pulse, is determined, this voltage being a representation of the pulse duration. It has been customary to charge the condenser, starting at a pulse time $t = 0$, the initial voltage being 0. Such an arrangement requires a circuit in which the characteristics of electronic components exhibit a sharp break, or bend, at the voltage value 0. It is difficult to obtain an overall characteristic of this type with customary circuit components.

SUBJECT MATTER OF THE PRESENT INVENTION

Briefly, to provide a simple circuit in which a linear relationship between pulse duration and proportional charging current, or final charge voltage is obtained, a certain delay period is inserted into the charge operation of the condenser with respect to the start of the pulse. Thus, the charge on the condenser, based on pulse duration, is started only after a certain time delay with respect to the start of the pulse. The condenser is kept at a predetermined charge level until the charge placed thereon based on pulse duration is connected. The initial charge voltage is representative of the delay time.

The arrangement avoids the necessity of utilizing components which have a sharp bend in their operating characteristics at the point of absolute zero to provide exact proportionality of current supply.

In accordance with a feature of the invention, successively occurring pulses, of a series or train of pulses are successively applied, alternatingly, to charge one or the other of a pair of condensers. Preferably, a bistable electronic switch, in the form of a flip-flop is provided, the flip-flop having a pair of output terminals which are oppositely polarized. The outputs are connected, each, over an AND-gate with the charging arrangement of the respective condensers. Additional AND-gates are provided, connecting the condensers to appropriate discharge and measuring devices or indicators. When the AND-gates are enabled, by means of a control connection, the particular pulse under consideration directs charge and discharge to the one or the other condenser so that, while one condenser is being charged, the charge on the other can be measured and indicated.

It is preferable to utilize condensers which have relatively small values of capacity. This requires a low loading on the condenser during testing for the charge thereon which, in turn, requires a high input resistance measuring instrument. In accordance with a feature of the invention, the measuring circuit includes a transistor connected as an emitter follower, particularly in Darlington circuit. One transistor, each, is connected to the respective condensors, which are alternately charged, the output of the transistors being measured in an indicating instrument.

The invention will be described by way of example with reference to the accompanying drawings, wherein:

FIG. 3 is a circuit diagram of an operating embodiment.

Figure 1:
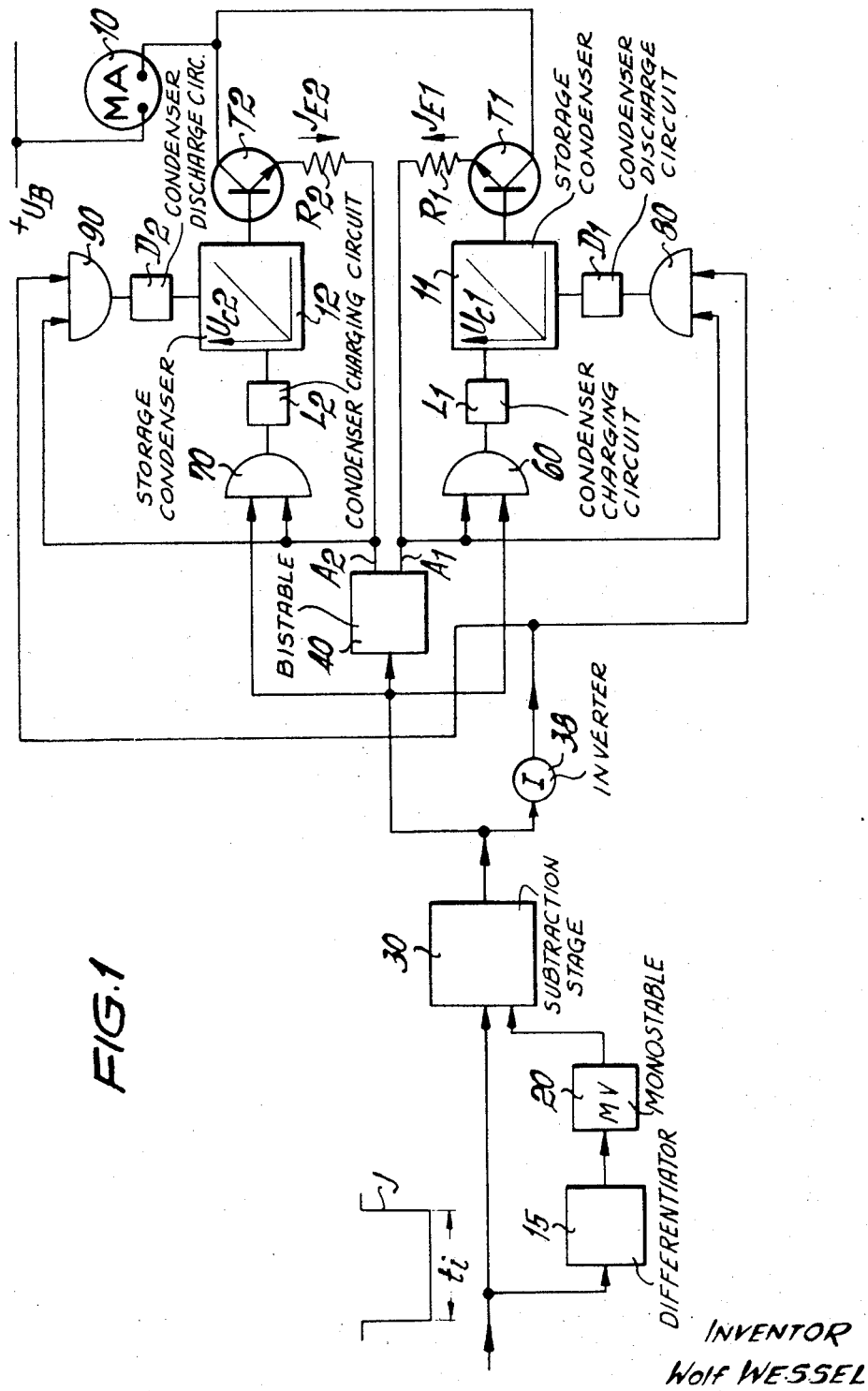
FIG. 1 is a schematic block circuit diagram of a circuit arrangement to measure the pulse duration, diagrams of signals being schematically indicated in, or next to, some of the circuit components.

Referring to FIG. 1: The circuit is particularly designed to measure the pulse duration of pulses which can succeed each other in irregular intervals, in time, and in which the pulse duration of succeeding pulses may vary. A current is to be provided which is proportionate to pulse duration. FIG. 1 illustrates the indicator as a milli-ampere meter 10 although, of course, other indicators, recorders and the like may be used. The circuit arrangement includes a pair of charging condensers 11, 12 which, during the duration of the pulse to be measured, are charged by a constant current. As the condensers charge, the voltage due to the charge being stored on the condenser rises, as schematically indicated as $U_c$, with subscripts 1 and 2 indicating the relationship with respect to the condensers 11, 12, respectively. The charge $U_c$ will be proportionate to pulse duration. At the end of the pulse, the charge, that is the voltage thereacross, can be measured. To measure the charge on the condenser, a transistor $T_1$, $T_2$ respectively, is provided. The transistors are connected with their collectors to indicator 10 and are connected in emitter follower circuits to have high input impedance. The emitter resistances $R_1$, $R_2$ are adjustable. A particularly desirable arrangement utilizes field effect transistors for transistors $T_1$, $T_2$, or a pair of npn transistors in Darlington circuit, as seen in FIG. 3.

The current characteristics of electronic circuit elements, particularly solid state elements of this type do not exhibit a sharp bend when they change from blocked to conductive condition but rather exhibit a gradual transition. In order to provide a sharp transfer of characteristics, the circuit in accordance with the present invention is so arranged that the transistors $T_1$ and $T_2$ are operated only within the linear region of their operating characteristics.

The circuit, in accordance with FIG. 1, includes a differentiator 15 and a monostable multivibrator 20, an impulse subtraction circuit 30, and a subsequent inverter stage 38. A bistable multivibrator 40 is provided, and so connected that subsequent consecutive pulses of a train of pulses are alternately applied to a pair of outputs $A_1$, $A_2$, exhibiting opposite polarity, to charge condensers 11, 12 alternately, and to also control connection of the particular read-out circuit which is appropriate to the condenser which has been charged with a just preceding pulse.

The condensers are to be discharged, in accordance with the invention, in advance of the next subsequent charging cycle not completely, but to a predetermined fixed remanent voltage. Each one of the condensers has a discharge arrangement connected thereto. To permit multivibrator 40 to control charge and discharge, each of the condensers is connected to a pair of AND-gates 60, 80, and 70, 90, respectively. Output $A_1$ of multivibrator 40 is connected to a first AND-gate 60 and over it with the charging arrangement $L_1$ of the first condenser 11, and further over a third AND-gate 80 with the discharge circuit $D_1$ associated with the condenser 11. The other output $A_2$ of flip-flop 40 is connected over a second AND-gate 70 with a charging arrangement $L_2$ and over a fourth AND-gate 90 with a discharge circuit $D_2$ of the second condenser 12.

Figure 2:
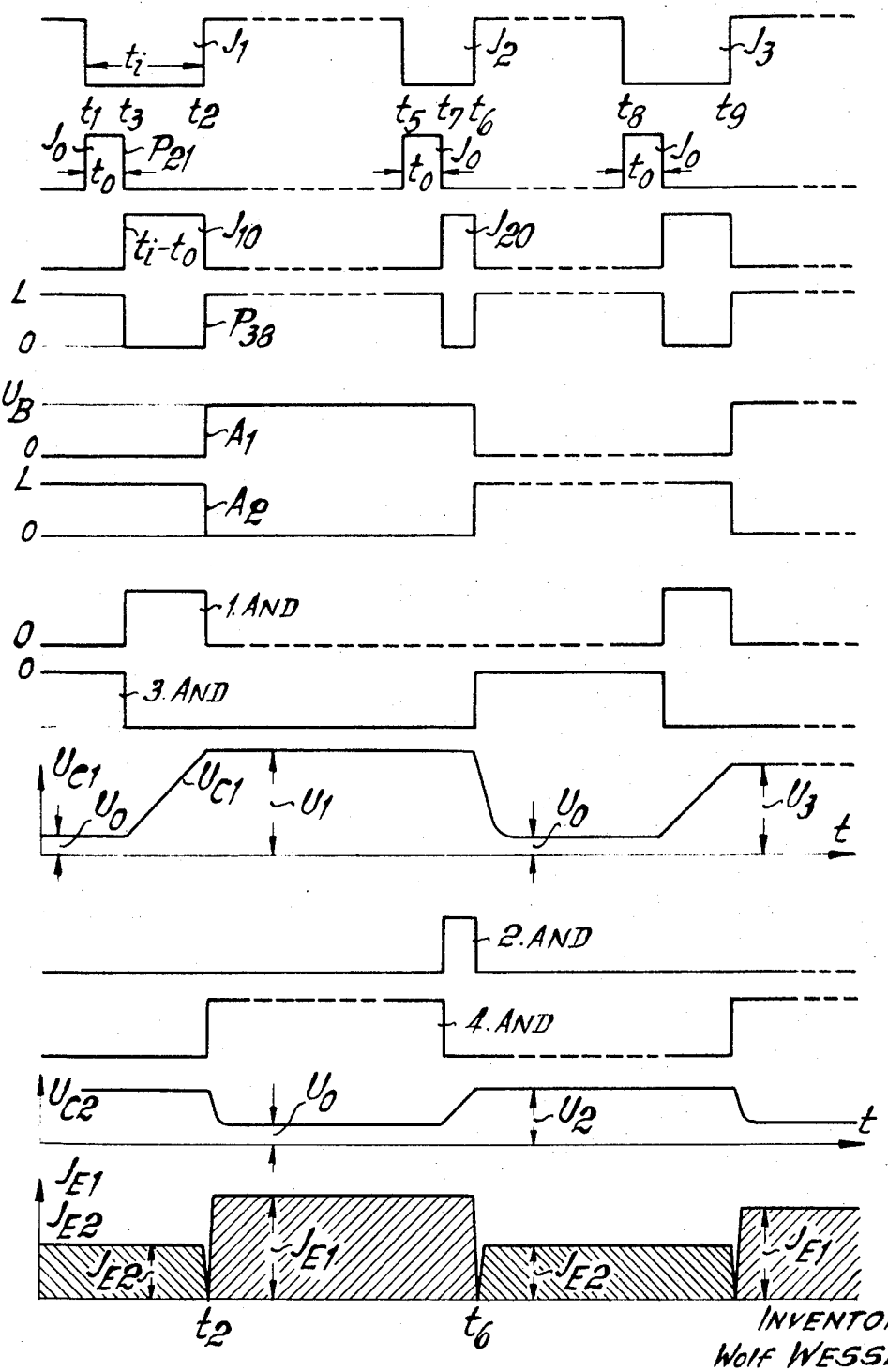
FIG. 2 is a timing and pulse graph used in the explanation of the invention.

Specifically, the circuit is constructed as shown in FIG. 3: A pulse to be measured, or a series of pulses J are first applied to differentiator 15 which includes a coupling condenser 16 of small capacity, a pair of voltage dividers 17, 18 and a diode 19. The diode is connected to the base of input transistor 21 of a monostable multivibrator 20. The monostable multivibrator 20 provides a delay time $t_o$, starting at the same time as the start of the pulse J to be measured. The multivibrator includes an output transistor 22 connected with its base over a resistance 23 to the collector of input transistor 21. Current is supplied from a main positive bus 25, and supplied over a resistance 24. The collector of output transistor 22 is connected to collector resistance 26 (and then to positive bus 25) and over a condenser 27 back to the base of transistor 21. Condenser 27, together with input transistor 21, when in quiescent state, provides current through base resistance 28 and provides the timing circuit, which determines the duration $t_o$ of the delay time. As soon as one of the pulses J begins, the input transistor 21 will block, output transistor 22 will become conductive and the charge on the condenser 27 is applied back to the input transistor and holds the input transistor blocked for a duration $t_o$, corresponding to a delay pulse $J_o$. The pulse duration $t_i$ of the pulse to be measured is thus shortened by the duration $t_o$. The collector of input transistor 21 as well as the input electrode of the coupling condenser 16 are connected over a pair of diodes 31, 32 to the base of a transistor 34 forming part of a pulse subtraction stage. The base of transistor 34 is connected to the common negative bus 35 over a base resistance 36. The collector is connected over collector resistance 37 with positive bus 25. Transistor 34 can be blocked only during that period of time when the input electrode of coupling condenser 16 is held negative due to a pulse J and when the collector of the input transistor is at, or approximately at negative potential. This condition is illustrated in FIG. 2 by lines $P_{21}$ (second line of the graph) in which the collector potential of transistor 21 is indicated. During the blocking of transistor 21, the collector is at positive voltage. Transistor 34 of the subtraction stage 30 can block only when the monostable multivibrator 20 returns to stable output state. In accordance with FIG. 3, this occurs only at the time $t_3$, which is delayed with respect to the beginning of the pulse $t_1$ by the delay time $t_o$, as indicated with respect to pulse $J_1$, first line of the graph of FIG. 2. At point $t_3$, the remainder of the pulse $J_{10}$ will switch bistable multivibrator 40, acting as a transfer switch, in its opposite state from that in which it had previously been set.

Bistable flip-flop 40 has a first npn transistor 41, and a second npn transistor 51 which are always in opposite state of conduction, or blocking, respectively. The bases of the two transistors are connected, each, over a resistance 44, 54, respectively, with negative bus 35. The collector of the first transistor 41 is connected over a resistance 47 with positive bus 25. This is the second output $A_2$ of the bistable multivibrator 40. The collector of the first transistor 41 is additionally connected over a resistance 58 and a diode 56 to the base of the second transistor 51. The collector of the second transistor 51 forms the first output $A_1$ of the alternate switch and is connected with positive bus 25 over a resistance 27. Additionally, the collector is connected over a resistance 48 and diode 46 to the base of the first transistor 41. The multivibrator is symmetrically built and is completed by a pair of coupling condensers 43, 43′, of equal value, one electrode of each being connected to the collector of transistor 34 of subtraction stage 30. The other electrode of condenser 43 is connected over resistance 42 to the collector of transistor 41 and to the cathode of a diode 45, the anode of which is connected to the anode of diode 46 and, in turn, to the feedback resistance 48. Similarly, the second electrode of coupling condenser 43′ is connected to the collector of the second transistor 51 over a resistance 52, and to the base of transistor 51 over a diode 55 which is coupled to the diode 56 and feedback resistance 58.

To prevent spurious switch-over and to insure holding of a defined output state, the bases of the transistors 41, 51 are interconnected by a holding circuit formed of resistance 59 and condenser 53.

Referring again to FIG. 2, potential $P_{38}$ (fourth line of graph) at the output of the inverter stage 38 (collector potential of the inverter transistor 38) is positive up to point $t_3$. Thus, transistor 61 (FIG. 3) of the first AND-gate 60 is held conductive over diode 67. The charging current provided by charging transistor 111, the value of which is set by resistance 112, does not charge condenser 11 but rather is bypassed. At point $t_3$, charge is initiated by blocking of the AND-gate transistor 61, so that the charging current is applied over diode 113 to the electrode of condenser 11 which is connected to an input or scanning transistor $T_{11}$ connected as an emitter follower to transistor $T_1$. The charging current is constant and thus provides a voltage $U_{c1}$ rising linearly during the duration of the pulse $J_{10}$ which, when the pulse terminates at point $t_2$, reaches a value $U_1$ (FIG. 2). The scanning or measuring circuit including transistors $T_{11}$ and $T_1$ is placed in circuit at the time $t_2$ to indicate the charge value $U_{c1}$. At that point, the first transistor 41 of circuit 40 is conductive, as indicated by the graph representative of the second output $A_2$ showing that the voltage returns to zero.

The two transistors $T_{11}$ and $T_1$, connected as emitter followers in Darlington circuit are connected to the indicating instrument 10. The current through the instrument is determined by the resistance $R_1$ and through the first transistor 41, which is proportional to the voltage $U_{c1}$ on condenser 11. This current is practically constant during the measuring current flow, since the indicating current hardly loads condenser 11. Scanning and indication continues until the termination of the next pulse $J_2$ (FIG. 2) at time $t_6$ (first and second lines, FIG. 2). At that time the indicator 10 will then measure the voltage on the second storage condenser 12, as determined by the second half of the circuit. At the point time $t_6$, the first output $A_1$ of the switch-over circuit 40 will revert to the potential of the negative bus 35. The AND-gate transistor 81 of the third AND-gate 80 is blocked and the previously blocked discharge transistor 101 will become conductive. Discharge of the charging condenser 11 occurs rapidly over the diode 114, poled to be conductive in the discharge direction, and over the collector-emitter path of the discharge transistor 101, until a voltage value $U_o$ is reached. This voltage $U_o$ is determined by the ratio of the two resistances 105, 107. The remaining voltage will be other than zero, and will be retained on the storage condenser 11 until the beginning of the next charging cycle. This remanent voltage is selected to have such a value that it corresponds to the charge which would accumulate during the delay pulse $J_o$.

The storage condenser 11 should not be charged at all over the resistance 105 during the period of time $t_6$, that is, while the discharge transistor 101 is in blocking state. To prevent any possibility of charge being applied over resistance 105, the collector of transistor 81 is interconnected by means of a diode 108 to resistance 105. Transistor 101 and transistor 81 are always in opposite states of conduction, that is, when one is blocked the other one is conductive. Diode 106 provides interconnection to the collector of transistor 101. The junction of diode 106 and resistance 105 is held at negative potential by the conductive AND gate transistor 81 when the discharge transistor 101 is blocked.

The second storage condenser 12 is similarly connected, and the circuit is symmetrical with respect thereto. The second AND-gate 70 has a transistor 71 with a collector resistance 72, a base resistance 74, and a pair of input diodes 76, 77, connected over resistance 75 to the base of transistor 71. Diode 76 is connected to the second output $A_2$ of the switch-over circuit 40; diode 77 is connected to the collector of the inverter transistor 38. Transistor 71 is brought into blocked state up to the end $t_7$ of the delay pulse $J_o$, which is initiated simultaneously with the start of the next pulse $J_2$ to be measured. Blocking of transistor 71 then permits the charging circuit $L_2$ associated with the transistor 121 to provide a charging current to condenser 12. The remaining pulse $J_{20}$ of the next pulse $J_2$ causes the voltage on condenser 12 to rise linearly until time $t_8$, that is, until the end of the pulse being measured. The voltage on condenser 12 will rise to a value $U_{c2}$. As indicated in the graph of FIG. 2, the pulse $J_2$ is shorter than the pulse $J_1$ and thus the value of the voltage $U_{c2}$ is less than the voltage $U_{c1}$ measured during the pulse $J_1$. The voltage $U_{c2}$ is sensed by the circuit including emitter follower transistors $T_2$ and $T_{12}$ and provides a current indicated as $J_{E2}$, corresponding to the voltage $U_{c2}$, this current being indicated in instrument 10 until, in the previously described manner, at the end of the third pulse $J_3$, at time $t_9$, the first condenser 11 is again placed in circuit. As can be seen from FIG. 3, the collectors of the four transistors operative in the measuring circuit are connected to a common collector line 10', which is connected to the meter 10.

As is apparent from the last graph of FIG. 2, the measuring indication is one step out of phase with the pulse actually being measured.

The measuring arrangement in accordance with the present invention has the particular advantage that each pulse can be measured with a high degree of accuracy and a sufficiently long period of time is available for reading of any one of the pulses. This is particularly important when electronically controlled fuel injection systems are to be adjusted, in which, due to operating conditions of the apparatus with which the systems are used, such as fixed values of pressure in the intake manifolds of the internal combustion engines, pulses of predetermined time duration must be obtained. An initial setting for the various pulses can be provided and adjustment of pulse duration, that is, of the circuit causing the pulses to have predetermined durations can readily be carried out since personnel adjusting the fuel injection system need concern itself solely with reading of the indicating instrument. The start of the pulses can be adjusted, as desired, by operating personnel, the pulse duration being measured on the instrument constantly and continuously until the next pulse comes along, the duration of which again will be indicated until the next succeeding pulse, and so on.

Various changes and modifications may be made within the inventive concept, particularly in the circuit, in the arrangement of the gates and the like.

I claim:

1. Pulse length measuring circuit arrangement to provide an electrical voltage or current representative of duration of input pulses comprising
    at least one charging condenser;
    a constant current source;
    means connecting the constant current source to charge the condenser during occurrence of the pulse;
    means sensing the charge on the condenser to provide a measure of the duration of the input pulse;
    means discharging the condenser to a predetermined charge level representative of a predetermined time duration to provide a predetermined minimum charge on the condenser;
    and delay means connected to delay, by said predetermined time, connection of the constant current source to the condenser by said connection means, to avoid charging the condenser from completely discharged state.

2. Circuit arrangement according to claim 1, to measure the time duration of individual pulses of a train of pulses, wherein a pair of condensers are charged in alternate sequence.

3. Circuit arrangement according to claim 2, including a bistable flip-flop having a pair of oppositely poled outputs;

AND-gates connected to said condensers, and means connecting the outputs to respective AND-gates associated with the condensers to selectively enable said AND-gates and thus application of pulses to one or the other condenser and to permit read-out of the charge from one or the other condenser.

4. Circuit arrangement according to claim 3, wherein said sensing means includes a pair of transistors one, each, being connected to a respective condenser, a measuring instrument, the output of the respective transistor being applied in parallel to the measuring instrument, said transistors being connected to the outputs of the bistable flip-flop and selectively enabled.

5. Circuit arrangement according to claim 2, including a bistable flip-flop having a pair of oppositely poled outputs, and further comprising a pair of input AND-gates, one each gate being connected to a respective charging circuit of a condenser;

a pair of output AND-gates, one each output AND-gate being connected to a respective discharge circuit of the condenser;

and means interconnecting the outputs from the flip-flop and the charging circuit of one condenser while connecting the discharge circuit of the other, in alternate sequences, to permit reading of the charge on one condenser while the other is charging, and vice versa.

6. Circuit arrangement according to claim 1, wherein the sensing means comprises a transistor having its base connected to the condenser.

7. Circuit arrangement according to claim 6, wherein the transistor is connected as an emitter-follower.

8. Circuit arrangement according to claim 7, wherein the transistor is a field effect transistor.

9. Circuit arrangement according to claim 6, wherein the transistor is connected in a Darlington circuit.

10. Circuit arrangement according to claim 6, wherein the sensing means includes a current measuring instrument connected to the transistor.

11. Circuit arrangement according to claim 1, wherein the condenser discharge means comprises a control transistor (101);

a source of voltage (25, 35);

a voltage divider network (105, 107) serially connecting the emitter-collector path to the source;

and means (114) connecting the condenser (11) to the tap point of the voltage divider in the emitter-collector path of the control transistor to discharge the condenser to a level determined by the voltage division ratio of the voltage divider and the resistance of the emitter-collector path of the transistor.

12. Pulse length measuring apparatus comprising a single indicator means (10);

a single pulse source (J);

a delay circuit (15, 20, 30) delaying start of the pulse by a predetermined time ($t_o$) but being ineffective to delay termination of the pulse, the output of said delay circuit providing modified pulses ($J_{10}$, $J_{20}$) which are shortened with respect to the pulses (J) from the source by said predetermined time ($t_o$);

two similar channels forming signal translation circuits, and a change-over switch (40), the change-over switch being connected to receive the modified, shortened pulses ($J_{10}$, $J_{20}$) and apply said modified pulses alternately to one and the other signal translation channels;

each said channel including a condenser (11, 12), means ($L_1$, $L_2$) charging the condenser during the connection of the modified pulse by said change-over switch to the respective channel to a level representative of the duration of said modified pulse, and a discharge circuit (105, 107, 101; 114) for the condenser (11, 12) partially discharging the respective condenser to a predetermined remaining charge level ($U_o$);

means connecting the fully charged condenser of a respective one channel to said indicator means (10) to provide an indication of the length of a pulse;

and means controlled by termination of the subsequent pulse connecting the discharge circuit to the condenser of said respective one channel to discharge the respective one condenser to said remaining charge level and permit charging the respective one condenser in accordance with the duration of the second next modified pulse after said predetermined time while the fully charged condenser of the other channel is connected to the indicator means to provide an indication of the next subsequent pulse.

13. Apparatus according to claim 12, wherein the delay circuit comprises a differentiator (15) and a monostable multivibrator (20) connected in series to the input pulse source;

and a pulse subtraction stage (30) providing no output upon conjoint occurrence of the input pulse and the pulse from the monostable multivibrator to provide an output pulse therefrom which forms said modified pulse shortened by the unstable time of the monostable multivibrator, said unstable time being said predetermined time ($t_o$).

14. Apparatus according to claim 12, wherein the discharge circuit comprises a control transistor (101), a source of voltage (25, 35), and a voltage divider network (105, 107) serially connecting the emitter-collector path of the control transistor (101) to the source;

and means (114) connecting the respective condenser to the tap point of the voltage divider in the emitter-collector path of the control transistor under command of the termination of a signal from the pulse source, to discharge the condenser to said remaining charge level determined by the voltage division ratio of the voltage divider and the resistance of the emitter-collector path of the transistor.

15. Apparatus according to claim 12, wherein each said signal translation circuit has two output transistors ($T_1$, $T_{11}$; $T_2$, $T_{12}$), both connected as emitter followers, the collectors of both the transistors, of each channel, being connected together and to said single indicator means (10), the transistors of each channel being connected to the change-over switch (40) to be alternately rendered conductive thereby.

* * * * *